3,383,412
PROCESS FOR PREPARING DICARBOXYLIC ACIDS
William E. Wellman, Edison, and Allen R. Kittleson, Westfield, N.J., assignors to Esso Research and Engineering Company, a corporation of Delaware
No Drawing. Filed Nov. 1, 1963, Ser. No. 320,854
8 Claims. (Cl. 260—537)

ABSTRACT OF THE DISCLOSURE 2,2,6,6-tetramethylpimelic acid is prepared by reacting a dialkali or dialkaline earth metal salt of phoronic acid, such as the disodium salt of phoronic acid, with hydrogen in the presence of an active hydrogenation catalyst at temperatures of from about 200 to 400° C. High purity products are obtained if the hydrogen is added to the phoronic acid reaction mixture after the mixture has been heated to a temperature of at least 200° C.

---

This invention relates to an improved method for preparing carboxylic acids and more particularly to an improved method for preparing 2,2,6,6-tetramethylpimelic acid (TMPA).

It has long been considered desirable to have α-dialkyl substituted carboxylic acids at a reasonable cost. Esters or amides derived from these α-dialkyl substituted carboxylic acids are known to possess improved hydrolytic and oxidative stability due to steric factors and also to the absence of a hydrogen atom on the carbon atom adjacent the carboxyl group.

2,2,6,6-tetramethylpimelic acid, a hindered dibasic acid, is a useful intermediate in the synthesis of high molecular weight polyesters and polyamides as well as in the synthesis of diesters for use as plasticizers. This acid has been synthesized previously [Haller and Baver, Comp. rend. 152, 1638 (1911); Roger Adams et al., JACS 73, 136–41 (1951)]. In both cases, however, the procedure used would be prohibitively long and expensive for ordinary purposes.

It is the object of this invention to provide a novel method for preparing hindered dibasic acids.

More specifically, it is the object of this invention to provide a novel economic method for preparing 2,2,6,6-tetramethylpimelic acid.

These objects will appear more clearly from the detailed specification and claims which follow.

It has now been found that 2,2,6,6-tetramethylpimelic acid can be readily and economically prepared by aldol condensation of acetone to form phorone, reacting the latter with HCN in the presence of sufficient alkali metal hydroxide to maintain the reaction medium (ethyl alcohol-water) at a pH above about 11 and at a temperature of about 30–90° C. to produce thereby a high yield of phoronic acid dilactam. This insoluble lactam is separated from the reaction medium as by filtration and is then saponified with dilute sulfuric acid to give the phoronic acid dilactone. The latter is saponified with aqueous alkali, preferably aqueous NaOH to a solution of the disodium salt of phoronic acid. The latter solution is then hydrogenated at elevated temperatures and pressures in the presence of a suitable hydrogenation catalyst. The resulting product is primarily the disodium salt of 2,2,6,6-tetramethylpimelic acid which upon acidification with mineral acid yields the free acid. On purification, the compound thus prepared has a melting point of 174° C. and a neutralization equivalent (N.E.) of 108.

The following reactions may be utilized in the preparation of 2,2,6,6-tetramethylpimelic acid.

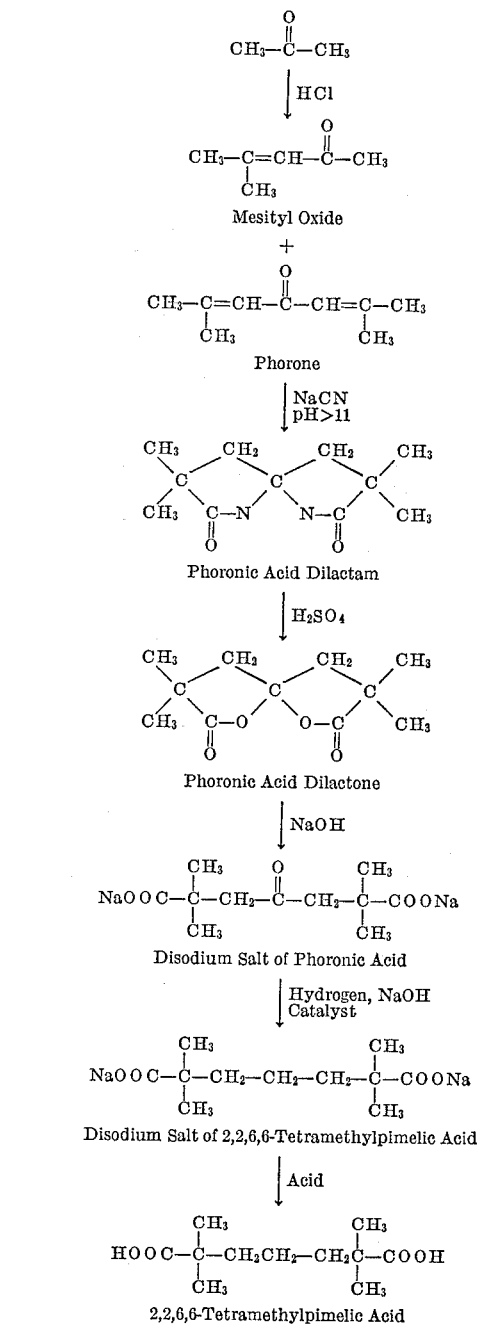

The phorone used as a starting material in this invention may be prepared, for example, by treating acetone with dehydrating agents, e.g., $ZnCl_2$, $H_2SO_4$ and HCl. Hydrochloric acid is best adapted for this purpose, the acetone being saturated with it, while it is cooled. Mesityl oxide is formed simultaneously with the phorone. The addition products which are first formed, $(CH_3)_2CCl \cdot CH_2 \cdot COCH_3$ and $(CH_3)_2CCl \cdot CH_2 \cdot COCH_2 \cdot CCl(CH_3)_2$, are decomposed by alkali hydroxides, and the mesityl oxide and phorone then separated by distillation.

Phorone may be readily converted to phoronic acid dilactam by heating a solution of 734 g. sodium cyanide, 480 ml. 95% ethanol, and 1600 ml. water to 60° C., and adding 734 g. phorone slowly over a period of 1.5 hours. The resulting solution is stirred at 60° C. for an additional 3 hours, diluted with water and cooled. Phoronic acid dilactam is precipitated and is filtered off (yield 684 g.). Numerous variations can be made in this procedure such as the use of alkalies, i.e., HCN and potassium and the like provided that the pH of the reaction mixture is above about 11 with temperatures between about 30 and 90° C.

Phoronic acid dilactam (200 g). is converted to the dilactone by refluxing for 48 hours with 30% sulfuric acid. The solution is then cooled and poured into 2.5 volumes of ice water. Filtration gave 192 g. of phoronic acid dilactone. Other acidic hydrolyzing media and temperature conditions can be used if desired or convenient.

The phoronic acid dilactone is then hydrolyzed with an aqueous solution of an alkali metal or alkaline earth metal hydroxide such as sodium hydroxide, potassium hydroxide, calcium hydroxide or the like. At least two moles of the base per mole of dilactone should be used and preferably an excess of the base is used. Reflux temperature is most probably best although lower temperatures can be used provided that sufficient time is allowed for the reaction to go to completion, i.e., to the dialkali metal or dialkaline earth metal salt of phoronic acid. It is preferred that sufficient excess base be present to maintain the hydrogenation reaction mixture at a pH above 8, preferably at a pH of 9 to 11.

The aqueous solution of the salt of phoronic acid in excess base is then subjected to hydrogenation at elevated temperatures and pressures in contact with a suitable hydrogenation catalyst. Hydrogenation is effected at temperatures of from about 200 to about 400° C., preferably at about 225–300° C. and at pressure sufficient to maintain the reaction medium in the liquid phase, i.e., at pressures above about 200 p.s.i.g. and up to about 10,000 p.s.i.g., preferably about 1000–2000 p.s.i.g. Reaction times of from about ½ hour to about 24 hours will usually suffice to complete the hydrogenation of the phoronic acid compound to the tetramethylpimelic acid compound.

In a preferred embodiment, an aqueous solution of an alkali metal salt of phoronic acid in an excess of the alkali metal hydroxide is heated to reaction temperature, i.e., to at least 200° C. separately or in contact with the hydrogenation catalyst whereupon the preheated reactant is charged to a reactor containing the catalyst to which excess hydrogen is then supplied to effect the reduction. In the case where the reactant is heated to reaction temperature in contact with the catalyst in a batch reactor or autoclave, introduction of hydrogen is delayed until the reactant is heated to at least 200° C. When hydrogen is introduced at lower temperatures the acid lactone (III) or the acid furan (V) are the major products while at higher temperatures, the selectivity to TMPA increases. The presence of excess base also favors TMPA formation. Using these observations, the following mechanism has been postulated, although this invention is not to be considered as restricted thereto.

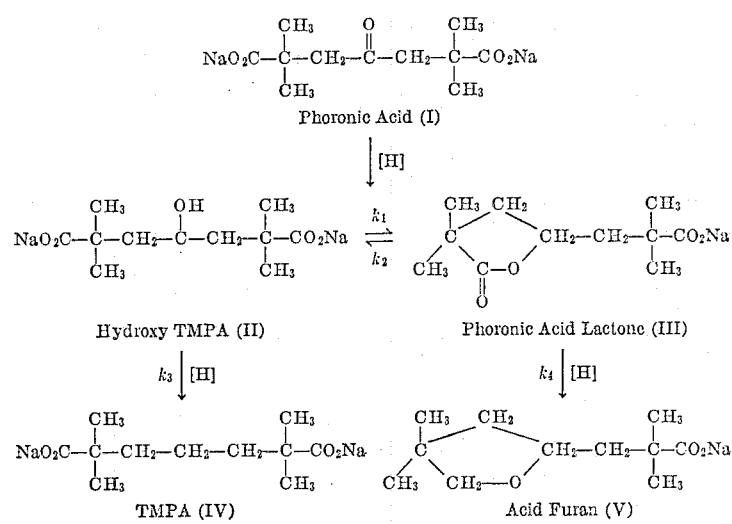

Phoronic acid, through reduction of the keto group to an alcohol, is converted to hydroxy-TMPA (II), which is in equilibrium with the phoronic acid lactone (III). Reduction of the acid lactone (III) gives the acid furan (V) while hydroxy-TMPA reduces to TMPA (IV). At lower temperatures, where the acid furan (V) or unreached acid lactone (III) are the major products, either the equilibrium is far to the right, $k_1 \gg k_2$, or the acid lactone hydrogenates much faster than hydroxy-TMPA, $k_4 \gg k_3$. As the temperature is raised, more TMPA is produced (although it is still not the predominant species) indicating that either the equilibrium is shifting more towards the hydroxy-TMPA or the rate of hydrogenation of hydroxy-TMPA is increasing faster than that of the acid lactone.

If this mechanism is correct, it should be possible under the proper coditions to convert the acid lactone (III) to TMPA instead of the acid furan (V). The conditions should be such that they shift the equilibrium toward hydroxy-TMPA (II), force hydroxy-TMPA to be rapidly reduced to TMPA, and prevent any acid lactone reduction which appears to occur at lower temperatures. In testing the theory, the acid lactone (III) was dissolved in excess base and heated to 250° C. in the presence of the ruthenium on carbon catalyst. Hydrogen was added only after the reactants had been heated to the reaction temperature. The product distribution of the recovered material showed 75% TMPA and only 25% acid furan.

In another run, the acid lactone (III) was dissolved in excess base and placed in the reactor with a ruthenium catalyst. Hydrogen was added, and then the reactor was heated to 180° C. The product was almost all acid furan (V), with only a trace of TMPA.

To further demonstrate the theory, phoronic acid and phorone dilactone were reduced under similar conditions with delayed hydrogen introduction, and they too gave high selectivities to TMPA, as shown below.

TABLE I

| Starting Material | Reaction Temp., ° C. | Unreacted Starting Material | Product Distrib. of Recov. Material | |
|---|---|---|---|---|
| | | | Acid Furan | TMPA |
| Phoronic Acid Lactone | 250 | 0 | 24.6 | 75.4 |
| Phoronic Acid | 295 | 0 | 3.4 | 94.0 |
| Phoronic Acid Dilactone | 270 | Trace | 4.8 | 95.2 |
| Do | 293 | 0 | 4.7 | 95.3 |

Catalysts which are effective for the hydrogenation are principally ruthenium, nickel, platinum, rhodium and cobalt. The catalysts, preferably in the form of the metal are distributed upon a support or carrier which should be resistant to hot caustic solutions. Carbon or charcoal is preferred as the base or support but other materials such as kieselguhr and diatomaceous earth may also be used. The preferred catalyst is one containing from about 0.1 to about 50 wt. percent ruthenium metal, preferably 5–10 wt. percent upon carbon. The amount of catalyst used may vary from about 5 to 50 wt. percent based upon the phoronic acid, phoronic acid lactone or phoronic acid dilactone to be reduced.

The following examples are illustrative of the present invention.

Example 1

Phoronic acid (115 g., 0.5 mole) was mixed with 200 g. of 50% NaOH and 1300 ml. $H_2O$. The mixture was placed in a 3-liter bomb with 15 g. of catalyst (5% ruthenium on carbon) and the system was flushed with nitrogen and heated to 295° C. for one hour. At this point, hydrogen at a pressure of approximately 1900 p.s.i.g. was added, and the system was kept at 295° C. with agitation for 11 hours.

After the hydrogenation, the contents of the bomb were removed and the catalyst was filtered off. The filtrate was acidified to pH 3 with conc. hydrochloric acid and a heavy white precipitate resulted. The solid was collected, dried, and then extracted continuously with chloroform. Eventually all of the solid dissolved in the chloroform (any unreacted phoronic acid would have been left as a solid, since it is extremely insoluble in chloroform). The chloroform was evaporated, and the resulting solid was extracted with petroleum ether. Concentration of the petroleum ether gave 2.6 g. of the acid furan (V). The petroleum ether insoluble material weighed 71.6 g. and was essentially pure 2,2,6,6-tetramethylpimelic acid. The selectivity to TMPA was 94%. The material balance was 71% and can be increased substantially by rigorously washing the catalyst, or by reusing the catalyst in subsequent runs.

Example 2

Phoronic acid (423 g.) was mixed with 566 g. of 50% NaOH and enough water to bring the volume to 1600 ml. Catalyst (30 g. of 5% ruthenium on carbon) was added and the system was flushed with nitrogen and heated to 260° C. After an hour at this temperature, hydrogen was added (1900 p.s.i.g.) and the system was kept at 260° C. for 8 hours. Work-up of the product as in Example 1 gave 16 g. of acid furan (V) and 358 g. (86.5% yield) TMPA.

Example 3

Phoronic acid (300 g.) was mixed with 418 g. 50% NaOH and enough water was added to bring the volume to 1700 ml. The mixture was placed in a bomb with 30 g. catalyst (5% ruthenium on charcoal), hydrogen was added to 1800 p.s.i.g., and the system was heated at 240° C. for 5 hours. Treatment of the reaction product in the usual manner gave 42.4 g. TMPA, 127 g. acid furan (V), and 80.5 g. unreacted phoronic acid. These results compared with those of the previous two examples emphasize and point out the need to introduce the hydrogen at a high temperature.

Example 4

Phoronic acid (230 g.) was mixed with 138 g. 50% NaOH and enough water was added to bring the volume to 1400 ml. The mixture was placed in a bomb with 30 g. 5% ruthenium on carbon, and the system was flushed with nitrogen and heated to 150° C. for one hour. Hydrogen was added at a pressure of 1750 p.s.i.g., and the system was kept at 150° C. for 14 hours. Treatment of the reaction product in the usual manner gave 147 g. of the acid lactone (III), 10 g. of the acid furan (V), and no TMPA. This experiment emphasizes the need for a sufficiently high hydrogenation temperature. It further points up the resistance these compounds have to hydrogenation.

Example 5

Phoronic acid (222 g.) was mixed with 159 g. 50% NaOH and enough water to bring the volume to 1400 ml. The mixture was placed in a rocker bomb with 20 g. Raney nickel catalyst and the system was flushed with nitrogen and heated to 250° C. for one hour. The hydrogen was added at 1700 p.s.i.g. and the system was kept at 250° C. for 12 hours. The reaction product was worked-up in the usual manner to give 48 g. TMPA and 154 g. unreacted phoronic acid.

Example 6

Phoronic acid dilactone (106 g.) was mixed with 320 g. of 50% NaOH and enough water to bring the volume to 1300 ml. The mixture was placed in a bomb with 15 g. of catalyst (5% ruthenium on carbon) and the system was flushed with nitrogen and heated to 270° C. for one hour. Hydrogen was added (1900 p.s.i.g.) and the system was heated at 270° C. for an additional 10 hours. The reaction product was treated as in Example 1 to give 89.1 g. of TMPA and 4.5 g. acid furan (V).

Example 7

The preceding example was repeated at a reaction temperature of 293° C., yielding 77.1 g. TMPA and 3.9 g. acid furan.

Example 8

Phoronic acid, 300 grams, is mixed with 418 grams of 50% sodium hydroxide and sufficient water is added to bring the volume to 1700 ml. In four separate runs the aforesaid mixture is placed in a bomb with about 30 grams of catalyst consisting of 5.0 wt. percent cobalt, rhodium, and platinum respectively upon a charcoal support. The system is heated to about 300° C. for about 1 hour. At this point hydrogen at a pressure of approximately 2000 p.s.i.g. is added and the system is held at about 300° C. with agitation for about 10 hours. Treatment of reaction product in the usual manner gives tetramethylpimelic acid in satisfactory yield.

Example 9

The acid lactone (III) (107 g.) was mixed with 200 g. of 50% NaOH and enough water to bring the volume to 1300 ml. The mixture was placed in a bomb with 30 g. catalyst (5% ruthenium on carbon) and the system was flushed with nitrogen and heated to 250° C. for 1 hour. At this point, hydrogen was introduced ($\approx$1900 p.s.i.g.) and the system was kept at 250° C. for 14 hours. The reaction product was treated as in Example 1 to give 40.4 g. TMPA and 13.2 g. of the acid furan (V).

Example 10

The acid lactone (III) (246 g.) was mixed with 94.5 g. 50% NaOH and enough water to bring the volume to 1700 ml. The mixture was placed in a bomb with 30 g. catalyst (5% ruthenium on carbon), hydrogen was added to 1810 p.s.i.g., and the system was heated at 200° C. for 4 hours. Treatment of the reaction product in the usual manner gave 126 g. of the acid furan (V) and 98 g. of unreacted acid lactone.

It is to be understood that this invention is not limited to these specific embodiments since numerous variations are possible without departing from the spirit and scope of this invention as defined in the following claims.

What is claimed is:

1. A process for the production of 2,2,6,6-tetramethylpimelic acid and its metal salts which comprises reacting a reagent selected from the group consisting of dialkali and dialkaline earth metal salts of phoronic acid contained in a reaction mixture maintained at a pH above 8 with hydrogen in the presence of an active hydrogenation catalyst at a temperature of about 200 to 400° C. and a pressure of from about 200 p.s.i.g. to about 10,000 p.s.i.g., the hydrogen being added to the phoronic acid reaction mixture after the mixture has been heated to at least 200° C., and recovering a metal salt of 2,2,6,6-tetramethylpimelic acid, which upon acidification yields the corresponding free acid.

2. The process of claim 1 wherein said reagent is a dialkali metal salt of phoronic acid.

3. The process of claim 2 wherein said reagent is the disodium salt of phoronic acid.

4. The process of claim 3 wherein the pH of the reaction mixture is maintained between about 9 and 11, the hydrogenation temperature between about 225 and 300° C., and the hydrogenation pressure of from about 1000 to 2000 p.s.i.g.

5. The process of claim 4 wherein the hydrogenation catalyst is ruthenium on a carbon support.

6. An improved method for preparing 2,2,6,6-tetramethylpimelic acid and its salts which comprises reacting a member of the group consisting of phoronic acid dilactone, phoronic acid lactone and phoronic acid with an excess of an alkali metal hydroxide, treating the resultant alkaline mixture with hydrogen in contact with a ruthenium on carbon hydrogenation catalyst at temperatures of about 200–400° C. and pressures of from about 200 p.s.i.g. to about 10,000 p.s.i.g., the hydrogen being added to the phoronic acid compound-alkali metal hydroxide mixture after the mixture has been heated to at least 200° C., and recovering the alkali metal salts of 2,2,6,6-tetramethylpimelic acid which on acidification yields the corresponding free acid.

7. An improved method for preparing 2,2,6,6-tetramethylpimelic acid and its salts which comprises reacting phoronic acid dilactone with at least two moles of sodium hydroxide per mole of dilactone in aqueous solution, treating the resultant alkaline mixture with hydrogen in contact with a hydrogenation catalyst consisting essentially of about 5 wt. percent ruthenium on a carbon support at temperatures of from about 200–400° C. and pressures of from about 200 to about 10,000 p.s.i.g., the hydrogen being added to the alkaline reaction mixture of phoronic acid dilactone and sodium hydroxide after the mixture has been heated to at least 200° C., and recovering the disodium salt of 2,2,6,6-tetramethylpimelic acid which on acidification yields the corresponding free acid.

8. An improved method for preparing 2,2,6,6-tetramethylpimelic acid and its salts which comprises reacting phoronic acid with at least two moles of sodium hydroxide per mole of phoronic acid in aqueous solution, treating the resultant alkaline mixture with hydrogen in contact with a hydrogenation catalyst consisting essentially of about 5 wt. percent ruthenium on a carbon support at temperatures of from about 200–400° C. and pressures of from about 200 to about 10,000 p.s.i.g., the hydrogen being added to the reaction mixture of phoronic acid and sodium hydroxide after the mixture has been heated to at least 200° C., and recovering the disodium salt of 2,2,6,6-tetramethylpimelic acid which on acidification yields the corresponding free acid.

References Cited

UNITED STATES PATENTS

| | | | |
|---|---|---|---|
| 3,278,431 | 10/1966 | Norway et al. | 260—537 |
| 3,187,046 | 6/1965 | Curtis | 260—570.8 |
| 3,187,047 | 6/1965 | Green | 260—570.8 |

FOREIGN PATENTS

| | | |
|---|---|---|
| 597,872 | 5/1960 | Canada. |
| 901,956 | 8/1945 | France. |

OTHER REFERENCES

Groggins: Unit Processes in Organic Synthesis, 1952, p. 494.

LORRAINE A. WEINBERGER, *Primary Examiner.*

V. GARNER, *Assistant Examiner.*